United States Patent
Hulsebus et al.

[19]

[11] Patent Number: 5,890,850
[45] Date of Patent: Apr. 6, 1999

[54] BOWL HAWG TOOL FOR ENLARGING VALVE BOWLS ON CYLINDER HEADS

[75] Inventors: Jon L. Hulsebus, Grandville; Randall D. Hilbrand, Zeeland, both of Mich.

[73] Assignee: K-Line Industries, Inc.

[21] Appl. No.: 984,586

[22] Filed: Dec. 3, 1997

[51] Int. Cl.$^6$ ................................................. B23B 35/00
[52] U.S. Cl. .......................... 408/1 R; 33/201; 408/18; 408/83.5; 408/188; 408/241 R
[58] Field of Search ................... 408/1 R, 18, 83.5, 408/187, 188, 189, 224, 241 R; 33/201, 471

[56] References Cited

U.S. PATENT DOCUMENTS

| | | |
|---|---|---|
| 784,652 | 3/1905 | Beardsley . |
| 1,088,945 | 3/1914 | Troutman . |
| 1,127,175 | 2/1915 | Brooks . |
| 1,330,915 | 2/1920 | Skinner . |
| 1,341,565 | 5/1920 | Krepps . |
| 1,349,153 | 8/1920 | Hoerner . |
| 1,430,673 | 10/1922 | Myers . |
| 1,439,440 | 12/1922 | Otis . |
| 1,442,804 | 1/1923 | Hicks . |
| 1,460,838 | 7/1923 | Bean . |
| 1,469,945 | 10/1923 | Morsdoff . |
| 1,572,752 | 2/1926 | North . |
| 1,592,092 | 7/1926 | Forster . |
| 1,631,850 | 6/1927 | Beard . |
| 1,667,218 | 4/1928 | Purnis ..................................... 408/83.5 |
| 1,825,007 | 9/1931 | McNaught .............................. 408/83.5 |
| 2,041,587 | 5/1936 | Beard . |
| 2,354,737 | 8/1944 | Brown . |
| 2,527,758 | 10/1950 | Oslund . |
| 2,778,122 | 1/1957 | Oleksin . |
| 2,821,098 | 1/1958 | Blickenstorfer . |
| 2,840,921 | 7/1958 | Swanson . |
| 2,883,761 | 4/1959 | Pfeiffer et al. . |
| 3,516,329 | 6/1970 | Rendahl ................................. 408/83.5 |
| 3,728,940 | 4/1973 | Peterson ................................ 408/83.5 |
| 4,611,959 | 9/1986 | Kress et al. . |
| 4,710,072 | 12/1987 | Heule . |
| 4,872,789 | 10/1989 | Field ...................................... 408/83.5 |
| 4,913,601 | 4/1990 | Tenand et al. ......................... 408/83.5 |
| 4,930,948 | 6/1990 | Bowen . |
| 5,154,551 | 10/1992 | Noggle . |

FOREIGN PATENT DOCUMENTS

| | | | |
|---|---|---|---|
| 2643002 | 8/1990 | France ................................. 408/83.5 |
| 132933 | 11/1978 | Germany ............................. 408/83.5 |

OTHER PUBLICATIONS

Exhibit A is a brochure of tools sold by Sunnen Products Company, VSC Seat Angle Cutter Kits for Engine Rebuilding, Catalog X–VSC–1000F, Copyright 1995.

Prior art K–Line Industries, Inc. Automotive Machine Shop Equipment, Tools & Supplies Catalog, Catalog No. 209A, p. 41, published at least as early as Oct. 1996.

Prior art Goodson Auto Machine Shop Tools and Supplies Price Catalog, 1997–1998 Catalog, p. 15.

*Primary Examiner*—Andrea L. Pitts
*Assistant Examiner*—Adesh Bhargava
*Attorney, Agent, or Firm*—Price, Heneveld, Cooper, DeWitt & Litton

[57] ABSTRACT

A bowl cutter for enlarging cylinder head valve bowls and the like that includes at least one cutting blade with first and second cutting edges. The bowl cutter further includes a body with at least one cutter mount including a clamp that securely holds the cutting blade at a preselected angular position. The cutting blade is pivotably connected to the body for angular adjustment of the cutting blade, and the clamp securely holds the cutting blade at a selected angular position wherein the first cutting edge is positioned to remove material from the base portion of an associated valve bowl, and the second cutting edge is positioned to remove material from a sidewall portion of an associated valve bowl.

47 Claims, 4 Drawing Sheets

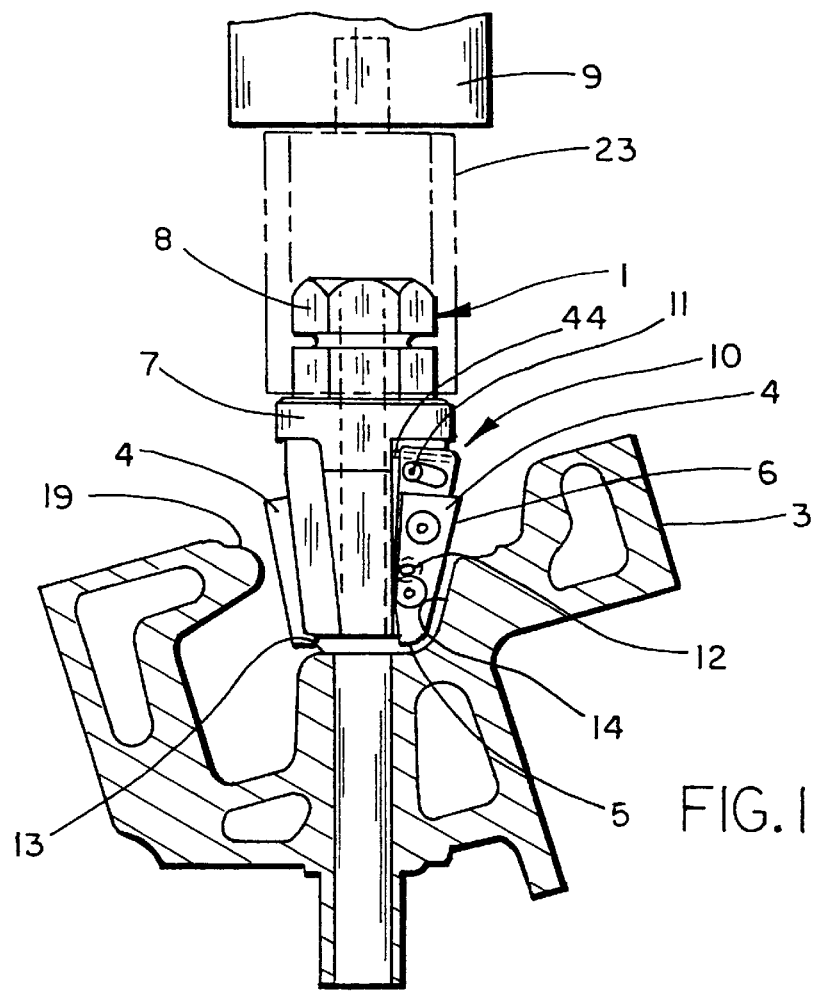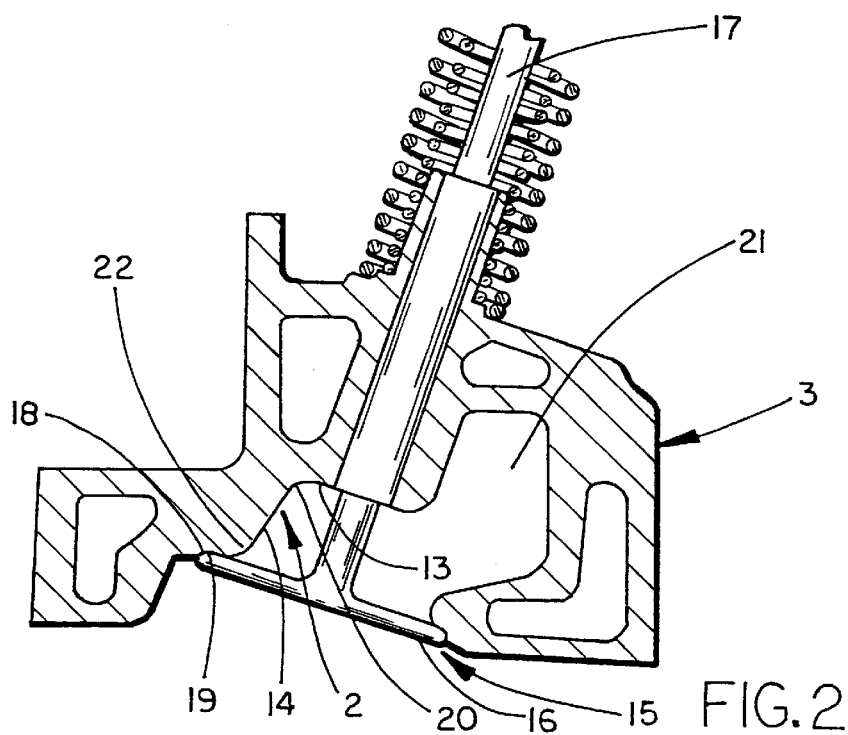

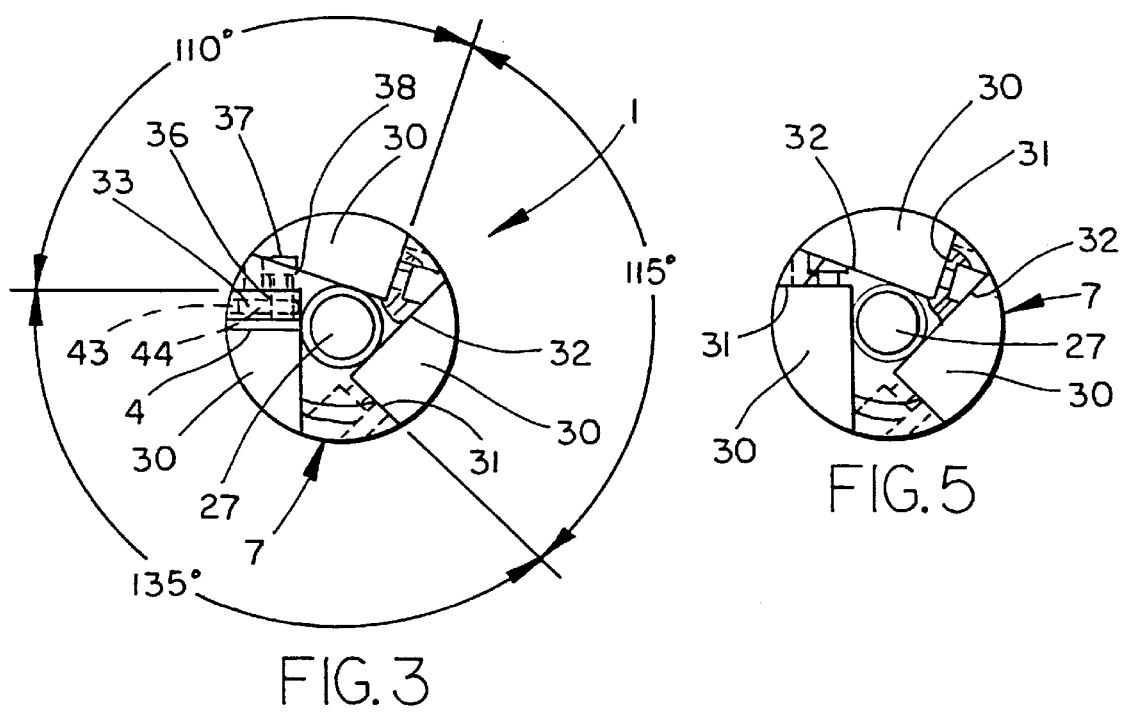
FIG. 3
FIG. 5
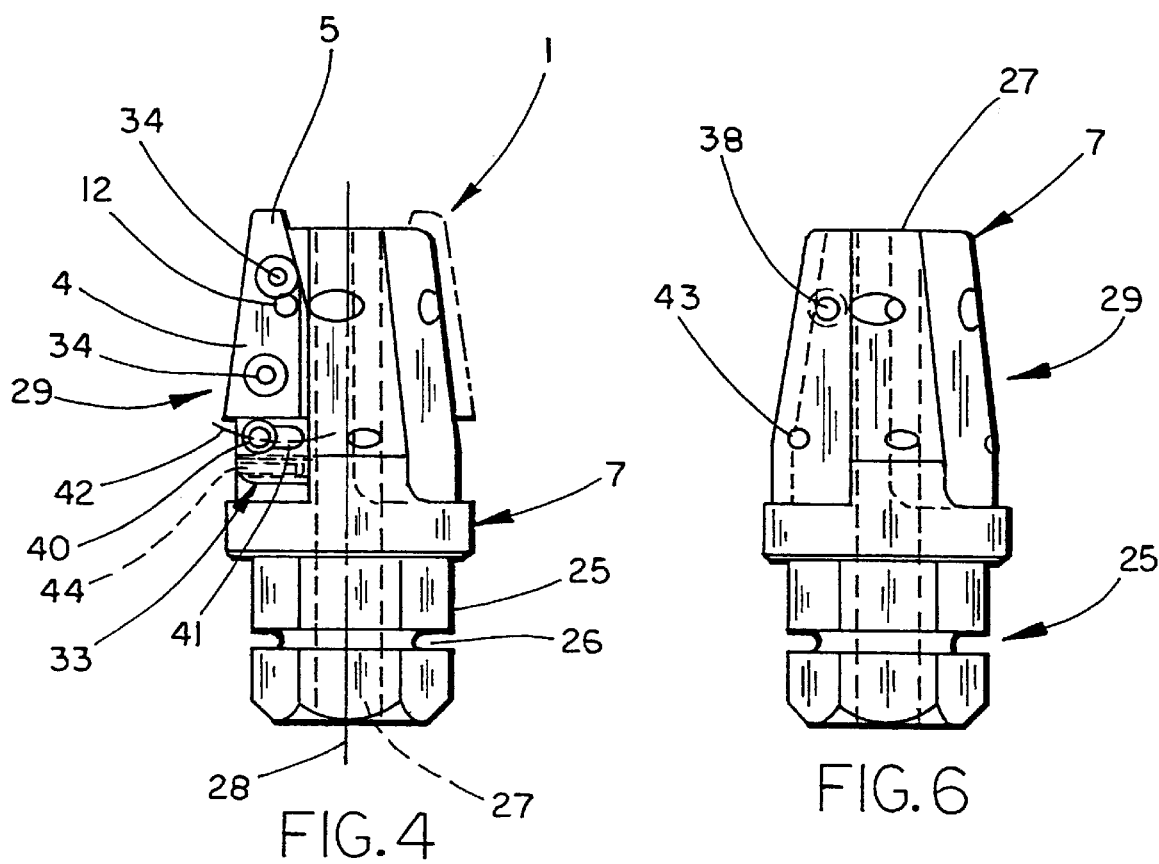
FIG. 4
FIG. 6

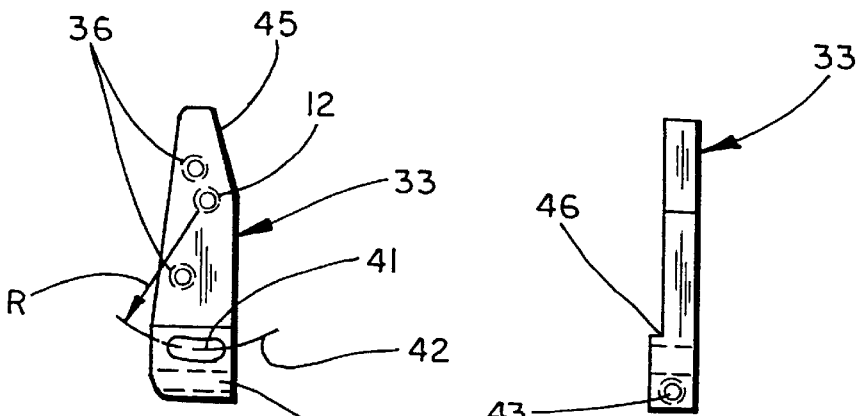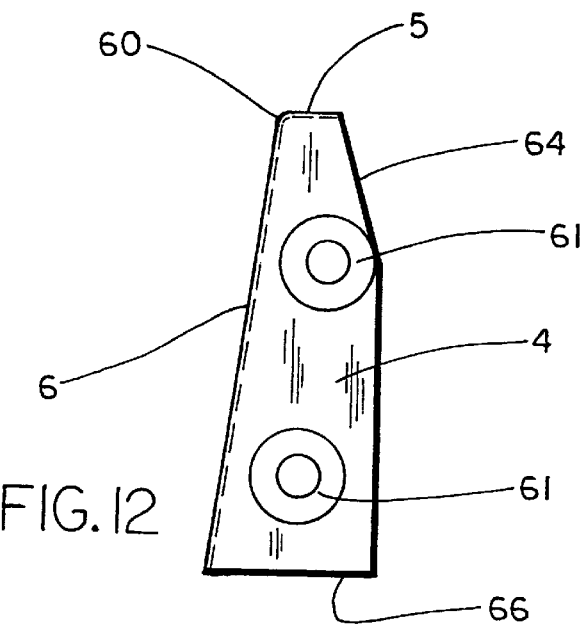

BOWL HAWG TOOL FOR ENLARGING VALVE BOWLS ON CYLINDER HEADS

BACKGROUND OF THE INVENTION

The present invention relates to a bowl cutter with replaceable, adjustable blades that are configured to remove excess material from the valve bowl of an engine cylinder head.

Internal combustion engines commonly include a cylinder head with intake valves that are selectively actuated to permit in-flow of air/fuel around the valves and through the valve bowls and intake ports. In a similar manner, exhaust valves also selectively allow exhaust gases to escape through exhaust ports. When a cracked cylinder head is repaired by welding, weld material often has to be removed to reform the valve bowl area and port areas for smooth gas flow. In addition, it is sometimes desirable to remove excess material from the valve bowl area to improve airflow around the intake or exhaust valves, particularly for high performance or racing applications. Historically, bowl cutters (also known as "bowl hogs" or "bowl hawgs") have non-adjustable, integrally formed cutting edges so that the machinist or repairman simply chooses the correct cutter for a particular job. The bowl cutters are each configured to cut specifically shaped bowls tailored for optimal performance in particular cylinder heads. However, there exists an increasing number of engine cylinder head designs such that it is difficult and expensive to keep all types and sizes of bowl cutters in stock. Variations in the valve size and the shape of the valve bowl complicate this problem. In addition, the cutter blades in known bowl cutting tools are not replaceable, requiring costly replacement of the entire bowl cutter when they are worn out. Accordingly, a cutting tool is desired, solving the aforementioned problems.

SUMMARY OF THE INVENTION

One aspect of the present invention is to provide a cutter for enlarging cylinder head valve bowls and the like that includes a cutter body, and at least one cutting blade mounted thereon with first and second cutting edges. The cutter body includes at least one cutter mount that is adapted to adjustably yet securely hold each cutting blade at an adjusted angular position. The cutting blade is pivotably connected to the body to permit angular adjustment of the cutting blade. A clamp securely holds the cutting blade at a selected angular position wherein the first cutting edge is positioned to remove material from a base portion of an associated valve bowl, and the second cutting edge is positioned to remove material from a sidewall portion of the associated valve bowl.

Another aspect of the present invention is to provide a cutter for enlarging cylinder head valve bowls and the like, including a body, and a cutting blade on the body with first and second cutting edges extending along approximately orthogonal side edges. A radiused cutting edge portion extends between the first and second cutting edges. The cutting blade includes one of an arcuate slot therethrough and a corresponding connector that is received in the slot to hold the cutting blade at a selected angular position, and the body portion has at least one blade holder that includes the other of the arcuate slot and the corresponding connector. The blade holder structurally and securely holds the cutting blade at the selected angular position.

Yet another aspect of the present invention is a kit including a bowl cutter and a gauge for adjusting the angle of blades on the bowl cutter. The bowl cutter includes at least one adjustable cutting blade having a first reference surface and a cutting edge extending along a side thereof, and further includes a body portion defining a second reference surface and a releasable cutting blade holder that securely yet releasably holds the cutting blade at a selected angular position. A gauge is provided that indicates the angle between the first and second reference surfaces, such that a user can quickly and easily set the cutting edge at a desired angular position.

Another aspect of the present invention is a method of machining a valve bowl of the cylinder head including the steps of providing a cutter with a body having a bore and centerline, and at least one cutting edge that is angularly adjustable with respect to the centerline of the cutter body. A portion of a gauge is placed into contact with the bore of the cutter. The cutting edge is then moved to a predetermined angle. The angle is determined by measuring the angle of the cutting edge relative to the bore of the cutter. The cutting edge is locked into position at a predetermined angle, and the cutting edge is placed in moving contact with the valve bowl of a cylinder head until a selected amount of material is removed.

Yet another aspect of the present invention is a method for enlarging a valve bowl of a cylinder head including the steps of fixedly securing a cutter blade to a cutter body. The cutter blade is then brought into moving contact with the valve bowl of the cylinder head until a selected amount of material is removed from the valve bowl.

These and other features, advantages and objects of the present invention will be further understood and appreciated by those skilled in the art by reference to the following specification, claims and appended drawings.

BRIEF DESCRIPTION OF THE DRAWINGS

FIG. 1 is a cross-sectional view of a bowl cutter according to the present invention positioned in a valve bowl of a cylinder head;

FIG. 2 is a cross-sectional view of a cylinder head showing a valve, valve bowl and intake/exhaust port;

FIG. 3 is an end view of the bowl cutter of FIG. 1;

FIG. 4 is a side elevational view of the bowl cutter of FIG. 1;

FIG. 5 is an end view of the cutter body of FIG. 4;

FIG. 6 is a side elevational view of the cutter body of FIG. 4;

FIG. 9 is a top plan view of the attachment member of FIG. 4;

FIG. 10 is a front elevational view of the attachment member of FIG. 4;

FIG. 11 is a side elevational view of the attachment member of FIG. 4;

FIG. 12 is a top plan view of the cutter blade of FIG. 4;

FIG. 13 is a front elevational view of the cutter blade of FIG. 4.

DETAILED DESCRIPTION OF PREFERRED EMBODIMENT

Figure 7:
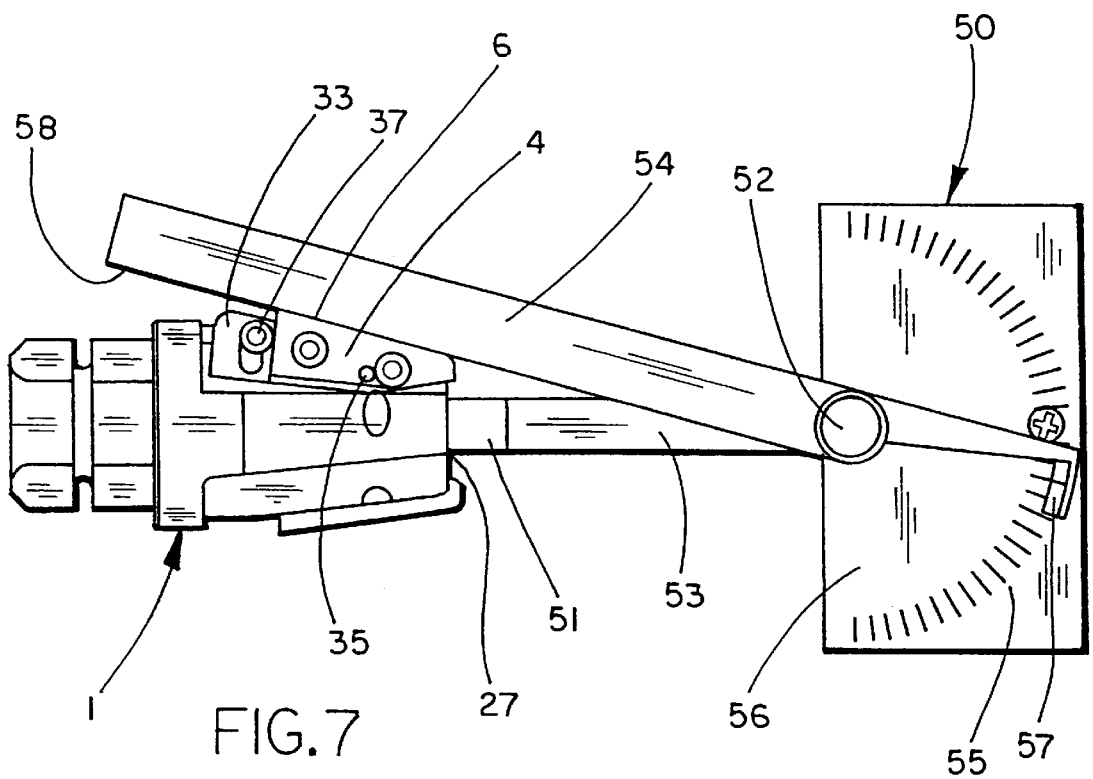
FIG. 7 is a top plan view of an angle-measuring gauge with a bowl cutter according to the present invention positioned thereon.

For purposes of description herein, the terms "upper," "lower," "right," "left," "rear," "front," "vertical,"

"horizontal," and derivatives thereof shall relate to the invention as oriented in FIG. 4. However, it is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

With reference to FIG. 1, a cutter 1 for enlarging the valve bowl 2 of an engine cylinder head 3 includes at least one adjustable cutting blade 4 with a first cutting edge 5 and a second cutting edge 6 shaped to reform a valve bowl. The cutter body 7 includes at least one cutter mount for receiving each cutting blade 4. It is contemplated that one or more cutting blades may be mounted on a given cutter body 7, and that the cutting blades need not necessarily be symmetrically spaced around the cutter body. A clamp 11 on body 7 is adapted to adjustably yet securely hold the cutting blade 4 at a preselected angular position. The cutting blade 4 is pivotally connected to the cutter body 7 at pivot 12, thereby permitting angular adjustment of the cutting blade 4. The clamp 11 securely holds the cutting blade 4 at a selected angular position wherein the first cutting edge 5 is positioned to remove material from the base portion 13 of the associated valve bowl 2, and wherein the second cutting edge 6 is positioned to remove material from a sidewall 14 of the valve bowl 2.

With reference to FIG. 2, an internal combustion engine cylinder head 3 includes a valve 15 with a generally disk-shaped portion 16 and a stem 17. The edge 18 of the valve 15 seats against the valve seat 19 when the valve is in the closed position as illustrated in FIG. 2. The valve bowl 2 is adjacent the valve seat 19, and includes a sidewall 14 and a base portion 13 with a radiused portion 20 joining the base and sidewall 13, 14. The port 21 leads to the intake or exhaust system of the engine. The airflow through the valve bowl 2 may be restricted, interrupted, or made undesirably turbulent by the presence of excess cylinder head material in the cylinder head. This excess material may be due to welding to repair a cracked cylinder head. In addition, the valve bowl configuration as manufactured may excessively restrict airflow for racing applications. Accordingly, in such situations it is desirable to remove the excess material indicated generally as 22 to provide increased airflow through the valve bowl 2 of the cylinder head 3.

With reference to FIGS. 3 and 4, the cutter 1 includes a cutter body 7 with a hexagonal end portion 25 for receiving a socket on a drill. The end portion 25 includes a groove 26 for receiving an O-ring (not shown) to hold the cutter 1 in the drill socket 23 (FIG. 1). The hex socket 23 is configured to connect the cutter 1 to an associated machine such as a mill 9. The cutter body 7 has a cylindrical bore 27 (FIGS. 3–4) extending along the centerline 28 of the cutter body 7. The lead section 29 of the cutter body 7 has a generally frusto-conical shape with at least one cut-out portion 30 having a generally triangular shape when viewed from an end of the cutter tool 1 (FIG. 3). The cut-outs 30 form a cavity with a blade supporting surface 31 and a generally orthogonal inner surface 32. The cut-outs 30 and the blade support surfaces 31 are located circumferentially around the centerline 28 of the cutter body 7 at non-uniform angles to prevent chatter, such as at angles of about 110°, 115° and 135°. However, the cutting blades 4 could be equi-angularly spaced if desired. Although three cut-outs 30 are shown, other configurations utilizing more or less blades and cut-outs could be used if desired for a particular application. Experimentation has shown that a single blade works satisfactorily.

Each cutting blade 4 is connected to a blade attachment member 33 by a pair of flat-head screws 34 (FIG. 4). The blade attachment member 33 is pivotally attached to the cutter body 7 at pivot 12. In the illustrated embodiment, pivotable connection 12 comprises a screw 37 that is received in threaded hole 36 in the blade attachment member 33. The head of the screw 37 is received within countersunk hole 38 in the cutter body 7 (FIG. 3).

Blade attachment member 33 includes an arcuate slot 41 that is spaced-apart from the pivot 35. The centerline 42 of the arcuate slot 41 is defined by a radius "R" extending from the pivot point 35 (FIG. 10). A screw 40 extends through the arcuate slot 41 and is threadably received into the threaded hole 43 in the cutter body 7. Arcuate slot 41 permits angular adjustment of the cutting blade 4 about the pivot 12, and the screw 40, in combination with screw 37 at pivot 12, securely clamps the cutting blade in a desired angular position. It is contemplated that various pivot and clamping configurations or other angular adjustment means could be utilized if desired.

With reference to FIGS. 9–11, the blade attachment member 33 includes a threaded hole 12 that provides a pivoting connection between the blade attachment member 33 and the cutter body 7. Threaded holes 36 receive flat-head screws 34 (FIG. 4) to secure the cutting blade 4 to the blade attachment member 33. The centerline 42 of the arcuate slot 41 is defined by the radius "R" (FIG. 10) extending from the pivot defined by threaded hole 43. Threaded hole 43 receives a set screw 44 (FIG. 4) that abuts the blade support surface 31 to provide secure angular positioning of the blade attachment member 33 and cutting blade 4 about the pivot point 12.

With reference to FIGS. 12 and 13, cutting blade 4 includes a first cutting edge 5 and an approximately orthogonal second cutting edge 6 with a radiused cutting edge portion 60 extending therebetween. These edges 5, 6 and 60 are oriented to form a particular relationship for forming a particularly shaped bowl. By providing blades having different relationships between the edges 5, 6 and 60, many different bowl shapes can be made. When this is combined with angular adjustment of the blades, a few blades can satisfy most all needs. A pair of countersunk clearance holes 61 on blade 4 are configured to receive the flat-head screws 34. The screws 34 are threadably received in threaded holes 36 to clampingly attach the cutting blade 4 to the blade attachment member 33. The front side edge 63 is angled inward slightly from the face surface 62 to provide clearance. The clearance is provided around the first cutting edge 5, the radius cutting edge 60 and the second cutting edge 6. The back side edge 65 of the cutting blade 4 includes an angled portion 64 corresponding to the angled portion 45 of the blade attachment member 33 to provide clearance from the inner surface 32 of cutter body 7 when the cutting blade 4 is pivoted outwardly. When the blade 4 is installed to the blade attachment member 33, the base edge 66 of the cutting blade 4 abuts the sidewall surface 46 of the blade attachment member 33. This prevents undesired upward movement of the cutting blade 4 against the blade attachment member 33 during machining operations.

In the illustrated example, the first and second cutting edges 5 and 6 are approximately orthogonal with a generally arcuate cutting edge portion 60 extending therebetween. However, the angle between the cutting edges 5 and 6 could vary from about 30° to almost 180°, with a preferred range of about 60° to 120° and a more preferred range of about 90° to 110°. The shape of the cutting edge facilitates shaping the valve bowl to a desired profile with a minimum number of machine set-ups and machining operations. The radiused cutting edge portion 60 of blade 4 may be arcuate or may have a varying radius to provide a blended shape between the base and sidewall 13, 14 of the valve bowl 2 as required for a particular application.

Figure 8:
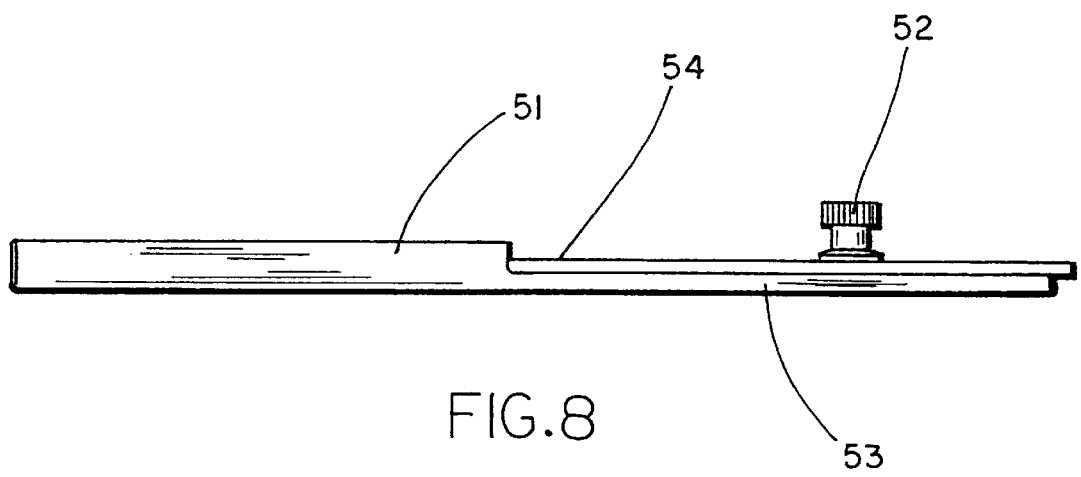
FIG. 8 is a front elevational view of the angle-measuring gauge.

An angle-measuring blade-setting gauge 50 (FIGS. 7–8) for bowl cutter 1 includes an elongated cylindrical first portion 51 that closely engages the axial bore 27 in the cutter body 7. A thumb screw 52 is threadingly received into the flat second portion 53 and rotatably connects the extension 54 to the flat portion 53. Indicia 55 on the flat plate 56 provide a reading of the angular position of the indicator 57 that corresponds to the angular position of the cutting edge 6 relative to the axial bore 27 in the cutter body 7. During use, the edge 58 of the extension 54 is placed against the cutting edge 6 of the cutting blade 4 in an abutting relationship. In the preferred embodiment, the axial bore 27 provides a first reference surface, and the cutting edge 6 provides a second reference surface. However, the gauge 50 could be modified to provide a reading from other reference surfaces on the cutter blade and cutter body to measure the angle of the cutting edge 6 relative to the cutter body 7.

During use, a cutting blade 4 with sharpened cutting edges is attached to a blade attachment member 33 by means of flat-head screws 34. If desired, the first and second cutting edges 5 and 6 may be ground to a particular shape to produce the desired corresponding final shape of the valve bowl. In addition, if the cutting blade 4 has been previously used, the cutting edge or edges may be sharpened as required. If the cutting blade 4 is extensively worn, a new cutting blade 4 may be chosen to replace the worn cutting blade. After the cutting blade 4 is fixed to the blade attachment member 33, the blade attachment member 33 is attached to the cutter body 7 by means of clamping screws 37 and 40. Prior to fully tightening the clamping screws, the cutter 1 is positioned on the cylindrical portion 51 of the gauge 50. The cutting edge 6 is then brought into abutting contact with the edge 58 of the extension 54. The cutting blade 4 and blade attachment member 33 are then pivoted about the pivot 12 until the desired preselected angle is attained. The screws 37 and 40 are then tightened to securely clamp the blade 4 at the desired angular position. In this way, each of the cutting blades 4 are set and held at the desired angle.

The cutter of the present invention provides angularly adjustable cutting blades that are configured to remove material from the valve bowl of a cylinder head to reform the valve bowls to a desired optimal shape. The cutting blades may be set at a desired angle depending on the application. Further, the cutting blades 4 are made from material such as high carbon steel or carbide for long life, and still further are configured to be replaced when excessively worn.

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the doctrine of equivalents.

The embodiments of the invention in which an exclusive property or privilege is claimed are defined as follows:

1. An adjustable bowl cutter for enlarging cylinder head bowls, comprising:

a body defining a centerline and including at least one cutter mount, the at least one mount including a clamp, said body defining a first end adapted for connection to a rotating machine and an opposite end;

at least one cutting blade having first and second cutting edges constructed to remove material in the shape of a valve bowl, the at least one cutting blade being pivotably connected to the at least one mount for angular adjustment, the clamp securely, yet releasably holding the cutting blade at an adjusted angular position wherein the first cutting edge is positioned to remove material from the base portion of an associated valve bowl adjacent the bore in the cylinder head that receives a reciprocating valve, said second cutting edge tapering outwardly away from said centerline adjacent said first end, such that said second cutting edge defines an angle relative to said centerline corresponding to a generally conical tapered sidewall portion of an associated valve bowl, and wherein the second cutting edge is substantially longer than said first cutting edge and positioned to remove material from a tapered sidewall portion of an associated valve bowl.

2. The adjustable bowl cutter defined in claim 1, wherein the first and second cutting edges form an angle in the range of about 60° to about 120° and are interconnected by a curvilinear cutting edge.

3. The adjustable bowl cutter defined in claim 2, wherein a radiused edge portion extends between first and second cutting edges.

4. An adjustable bowl cutter for enlarging cylinder head valve bowls, comprising:

a body with at least one cutter mount, the at least one mount including a clamp;

at least one cutting blade having first and second cutting edges constructed to remove material in the shape of a valve bowl, the at least one cutting blade being pivotably connected to the at least one mount for angular adjustment, the clamp securely, yet releasably holding the cutting blade at an adjusted angular position wherein the first cutting edge is positioned to remove material from the base portion of an associated valve bowl, and wherein the second cutting edge is positioned to remove material from a sidewall portion of the associated valve bowl;

said first and second cutting edges forming an angle in a range of about 60° to about 120° and interconnected by a radiused edge portion extending between first and second cutting edges; and said clamp including an arcuate slot with a connector extending therethrough to securely hold the blade in a selected position.

5. The adjustable bowl cutter defined in claim 4, wherein the cutter mount further includes a cavity in the body portion, the cavity having a support surface, the cutting blade abutting the support surface.

6. The adjustable bowl cutter defined in claim 5, wherein the support surface of the cavity is substantially flat and extends radially outwardly from a centerline of the cutter body.

7. The adjustable bowl cutter defined in claim 6, wherein the connector is a screw that extends through the arcuate slot to clamp the cutting blades into a preselected position.

8. The adjustable bowl cutter defined in claim 7, wherein the at least one cutting blade comprises a plurality of cutting blades equi-angularly spaced about a centerline of the cutter body.

9. The adjustable bowl cutter defined in claim 8, wherein the cutting blades include an extendable support that abuts an inner surface of the cavity to thereby prevent inward pivoting movement of the cutting blades from the preselected position.

10. The adjustable bowl cutter defined in claim 9, wherein the extendable support comprises a set screw that is threadably received in an opening in the cutting blade.

11. The adjustable bowl cutter defined in claim 10, wherein the cutting blade includes an attachment member, the attachment member including a plurality of threaded openings that receive screws for holding the cutting blade to the attachment member.

12. The adjustable bowl cutter defined in claim 11, wherein the arcuate slot is defined by the attachment member, and the set screw is threadably received in the attachment member.

13. The adjustable bowl cutter defined in claim 12, wherein the plurality of blades comprises three blades that are equi-angularly positioned about a centerline of the cutter body.

14. The adjustable bowl cutter defined in claim 13, wherein the cutting blades are made of a high carbon tool steel.

15. The adjustable bowl cutter defined in claim 14, wherein the cutter body has a bore therethrough with an elongated portion of a gauge closely received therein, the gauge including a second member abutting a selected one of the second cutting edges, the gauge indicating the angle between the second cutting edge and the centerline of the cutter.

16. An adjustable bowl cutter for enlarging cylinder head valve bowls, comprising:

a body with at least one cutter mount, the at least one mount including a clamp;

at least one cutting blade having first and second cutting edges constructed to remove material in the shape of a valve bowl, the at least one cutting blade being pivotably connected to the at least one mount for angular adjustment, the clamp securely, yet releasably holding the cutting blade at an adjusted angular position wherein the first cutting edge is positioned to remove material from the base portion of an associated valve bowl, and wherein the second cutting edge is positioned to remove material from a sidewall portion of the associated valve bowl; and said clamp including an arcuate slot with a connector extending therethrough to securely hold the blade in a selected position.

17. The adjustable bowl cutter defined in claim 1, wherein the cutter mount comprises a cavity in the body portion, the cavity having a support surface, wherein the blade abuts the support surface.

18. The adjustable bowl cutter defined in claim 1, wherein the cutting blades have a continuously adjustable member that abuts an inner portion of the cavity to thereby prevent inward pivoting movement of the cutting blades.

19. An adjustable bowl cutter for enlarging cylinder head valve bowls, comprising:

a body with at least one cutter mount, the at least one mount including a clamp;

at least one cutting blade having first and second cutting edges constructed to remove material in the shape of a valve bowl, the at least one cutting blade being pivotably connected to the at least one mount for angular adjustment, the clamp securely, yet releasably holding the cutting blade at an adjusted angular position wherein the first cutting edge is positioned to remove material from the base portion of an associated valve bowl, and wherein the second cutting edge is positioned to remove material from a sidewall portion of the associated valve bowl; and said cutter body having a bore therethrough with a cylindrical portion of a gauge closely received therein, the gauge including a second member abutting a selected one of the second cutting edges, the gauge indicating the angle between the second cutting edge and the centerline of the cutter.

20. A bowl cutter for enlarging cylinder head valve bowls, comprising:

a body portion having at least one blade holder that includes one of an arcuate slot and a corresponding connector; and at least one cutting blade assembly pivotally mounted to said body portion and having first and second cutting edges extending along side edges with a radiused cutting edge portion extending therebetween, the cutting blade assembly including the other of the arcuate slot and the corresponding connector, the connector engaging the slot to hold the cutting blade at an adjustable angular position, and the blade holder being configured to securely hold the cutting blade at the selected angular position.

21. A bowl cutter for enlarging cylinder head valve bowls, comprising:

a body portion having at least one blade holder that includes one of an arcuate slot and a corresponding connector;

at least one cutting blade assembly having first and second cutting edges extending along side edges with a radiused cutting edge portion extending therebetween, the cutting blade assembly including the other of the arcuate slot and the corresponding connector, the connector engaging the slot to hold the cutting blade at a selected angular position, and the blade holder being configured to securely hold the cutting blade at the selected angular position; and said cutting blade assembly including an attachment member defining the arcuate slot and the connector is fixed to the body portion to thereby affix the cutting blade at the selected angular position.

22. The bowl cutter defined in claim 21, wherein the connector comprises a screw that is threadably received in the body portion of the cutter to hold the cutting blade at a selected angular position.

23. The bowl cutter defined in claim 22, wherein the blade holder is defined by a cavity in the body portion of the cutter, the cavity including a support surface abutting the cutting blade.

24. The bowl cutter defined in claim 23, wherein the attachment member includes a sidewall that abuts an edge of the cutting blade.

25. The bowl cutter defined in claim 24, wherein the radiused cutting edge portion is arcuate.

26. The bowl cutter defined in claim 25, wherein the at least one cutting blade comprises a plurality of cutting blades that are non-uniformly angularly located about a centerline of the cutter.

27. The bowl cutter defined in claim 20, wherein the at least one cutting blade comprises a substantially flat blade with the first and second cutting edges extending along first and second side edges thereof.

28. A bowl cutter for enlarging cylinder head valve bowls, comprising:

a body defining upper and lower ends and a centerline, the body having a portion adapted for rigid connection to an associated machine for rotation about the centerline;

a removable, replaceable blade including a side cutting edge defining upper and lower ends and extending at an angle to the centerline such that said upper end of said side cutting edge is spaced-apart from said centerline a greater distance than said lower end of said side cutting edge, said blade further including a base cutting edge at an angle relative to the side cutting edge and substantially perpendicular thereto, wherein the base cutting edge has a length that is substantially less than the side cutting edge for making a deep bowl-shaped cut; and wherein the body includes cutter mounts removably securing the blade so that the side and base cutting edges simultaneously remove excess material in a valve bowl of a cylinder head.

29. The bowl cutter defined in claim 28, wherein the cutter includes a cutting blade defining the side and base cutting edges.

30. The bowl cutter defined in claim 29, wherein the cutting blade includes a curvilinear edge portion extending between the side cutting edge and the base cutting edge.

31. The bowl cutter defined in claim 30, wherein the curvilinear edge portion is arcuate.

32. A bowl cutter for enlarging cylinder head valve bowls, comprising:

a body defining a centerline, the body having a portion adapted for rigid connection to an associated machine for rotation about the centerline;

a removable, replaceable blade including a side cutting edge extending at an angle to, but approximately parallel to the centerline, and a base cutting edge at an angle relative to the side cutting edge and substantially perpendicular thereto, wherein the base cutting edge has a length that is substantially less than the side cutting edge for making a deep bowl-shaped cut;

said body including cutter mounts removably securing the blade so that the side and base cutting edges simultaneously remove excess material in a valve bowl of a cylinder head;

said cutter including a cutting blade defining the side and base cutting edges;

said cutting blade including an arcuate edge portion extending between the side cutting edge and the base cutting edge; and said cutting blade including an arcuate slot, the cutter further including a threaded member that is received through the arcuate slot into the cutter body to fix the cutting blade at a selected angular position.

33. The bowl cutter defined in claim 32, wherein the cutting blade is pivotally mounted to the cutter body at a spaced-apart location from the arcuate slot.

34. The bowl cutter defined in claim 33, wherein the cutter mount includes a blade support surface and a clearance surface, and wherein the cutting blade abuts the blade support surface and further includes an extendable member abutting the clearance surface to prevent angular movement of the cutting blade from the selected angular position.

35. The bowl cutter defined in claim 34, wherein the cutting blade further includes an attachment member defining the arcuate slot and the pivotable mount to the cutter body, the cutting blade being rigidly fixed to the attachment member.

36. The bowl cutter defined in claim 35, wherein the attachment member defines a blade support surface abutting the cutting blade, the attachment member further defining a sidewall extending orthogonally from the blade support surface, the sidewall abutting an upper edge of the cutting blade to prevent vertical movement of the cutting blade on the attachment member.

37. The bowl cutter defined in claim 28, wherein the side and base cutting edges are approximately orthogonal.

38. A kit, comprising:

a cutter having a body portion defining a bore, a releasable cutting blade holder, and at least one adjustable cutting blade having a first reference surface, the blade having a first cutting edge extending along a first side thereof, the holder and body portion being configured to securely yet releasably hold the cutting blade at a selected angular position; and a gauge that indicates the angle between the first reference surface and the bore such that a user can quickly and easily set the at least one cutting blade to orient and hold the cutting edge at a desired angular position.

39. The kit defined in claim 38, wherein the body portion of the cutter defines a cylindrical bore therethrough and the gauge includes an elongated member that is closely received within the bore, the bore defining the second reference surface.

40. The kit defined in claim 39, wherein the gauge includes a second member that is pivotably connected to the elongated member.

41. The kit defined in claim 40, wherein the cutting blade includes a second cutting edge extending along a second side of the cutting blade.

42. The kit defined in claim 41, wherein the first and second cutting edges form an angle in the range of about 60° to about 120°.

43. The kit defined in claim 42, wherein a radiused cutting edge extends between the first and second cutting edges.

44. The kit defined in claim 43, wherein the first reference surface comprises the first cutting edge.

45. The kit defined in claim 44, wherein the gauge includes a flat member that is fixed to a second end of the elongate member, the flat member including indicia on the surface, the second gauge member being pivotally connected to the flat member with an extension extending from the pivot point, the extension providing an indication of the relative angular position between the elongated gauge member and the second gauge member.

46. The kit defined in claim 45, wherein a first end of the cutting blade is pivotably mounted to the cutter body, and a second end of the cutting blade is rigidly yet releasably fixed to the cutter body.

47. The kit defined in claim 46, wherein the cutting blade defines an arcuate slot adjacent the second end, the cutter further including a threaded member that extends through the arcuate slot and is threadably received into the cutter body to thereby rigidly fix the second end of the cutting blade when the threaded member is in a tightened condition.

* * * * *